United States Patent
Jiang

(10) Patent No.: US 6,795,880 B2
(45) Date of Patent: Sep. 21, 2004

(54) SYSTEM AND METHOD FOR PROCESSING HIGH SPEED DATA

(75) Inventor: Baofeng Jiang, Pleasanton, CA (US)

(73) Assignee: SBC Technology Resources, Inc., Austin, TX (US)

( * ) Notice: Subject to any disclaimer, the term of this patent is extended or adjusted under 35 U.S.C. 154(b) by 37 days.

(21) Appl. No.: 10/288,266

(22) Filed: Nov. 5, 2002

(65) Prior Publication Data

US 2004/0088454 A1 May 6, 2004

(51) Int. Cl.$^7$ .............................................. G06F 13/12
(52) U.S. Cl. ........................... 710/68; 710/74; 709/704
(58) Field of Search ............................. 710/30, 33, 52, 710/65, 68, 74, 66; 709/246, 267, 704; 711/100, 105, 112, 202

(56) References Cited

U.S. PATENT DOCUMENTS

| | | | |
|---|---|---|---|
| 5,130,792 A | * | 7/1992 | Tindell et al. ................. 358/85 |
| 5,235,578 A | | 8/1993 | Baas et al. |
| 5,307,413 A | * | 4/1994 | Denzer ........................ 380/49 |
| 5,666,460 A | | 9/1997 | Ohta et al. |
| 6,104,506 A | * | 8/2000 | Hirokawa .................... 358/444 |
| 6,345,350 B2 | * | 2/2002 | Maruyama et al. ......... 711/202 |
| 6,421,749 B1 | * | 7/2002 | Devlin et al. ................. 710/65 |
| 6,459,429 B1 | * | 10/2002 | Deering ....................... 345/423 |

OTHER PUBLICATIONS

Lee, Jang–Soo et al., "Design and evaluation of a selective compressed memory system"; Proceedings 1999 IEEE International Conf. on Computer Design: VLSI in Computers; pp 184–191, Oct. 10, 1999.

Lee, Jang–Soo et al., "An on–chip cache compression technique to reduce decompression overhead and design complexity"; Journal of Systems Architecture; vol. 46, No. 15, pp 1365–1382.

* cited by examiner

Primary Examiner—Jeffrey Gaffin
Assistant Examiner—Alan Chen
(74) Attorney, Agent, or Firm—Toler & Larson & Abel, L.L.P.

(57) ABSTRACT

The present invention relates generally to a method and system for processing data. In a particular embodiment, the method includes receiving data to be processed from a network communication channel, storing the received data to be processed in memory based files at a computer memory that is local to and directly coupled to a processor via a high-speed memory bus, processing the received and stored data at the processor to produce processed data, compressing the processed data using a data compression software routine resident at the computer memory to produced processed and compressed data, and storing the processed and compressed data at a computer disk storage unit.

6 Claims, 2 Drawing Sheets

SYSTEM AND METHOD FOR PROCESSING HIGH SPEED DATA

BACKGROUND

1. Field of the Invention

The present invention relates generally to a method and system for processing high speed data.

2. Description of the Related Art

When a conventional computer system, such as found at a computer server connected to a distributed computer network, is configured to process high volumes of data from a source that generates a continuous data stream, the data is typically first written to a magnetic disk and then read from the magnetic disk. The data read from the magnetic disk is then processed and the processed data is written back to the disk. This conventional data processing method limits data processing speeds based on the write and read times for storage media, such as magnetic disks. For high speed data processing applications, this limit on processing capability is disadvantageous.

Accordingly, there is a need for an improved method and system for processing high speed data.

SUMMARY

The present invention relates generally to a method and system for processing data. In a particular embodiment, the method includes receiving data to be processed from a network communication channel, storing the received data to be processed in memory based files at a computer memory that is local to and directly coupled to a processor via a high-speed memory bus, processing the received and stored data at the processor to produced processed data, compressing the processed data using a data compression software routine resident at the computer memory to produce processed and compressed data, and storing the processed and compressed data at a computer disk storage unit.

In another particular embodiment, the system includes a data processing device receiving input data to be processed and a dynamic computer memory directly coupled to the data processing device via a high-speed memory bus. The input data to be processed is communicated over a network communication channel. The dynamic computer memory includes memory based files storing the input data to be processed. The dynamic computer memory includes memory resident compression logic to compress output data that is produced by the data processing device after processing the input data.

BRIEF DESCRIPTION OF THE DRAWINGS

The use of the same reference symbols in different drawings indicates similar or identical items.

DETAILED DESCRIPTION OF THE DRAWINGS

Figure 1:
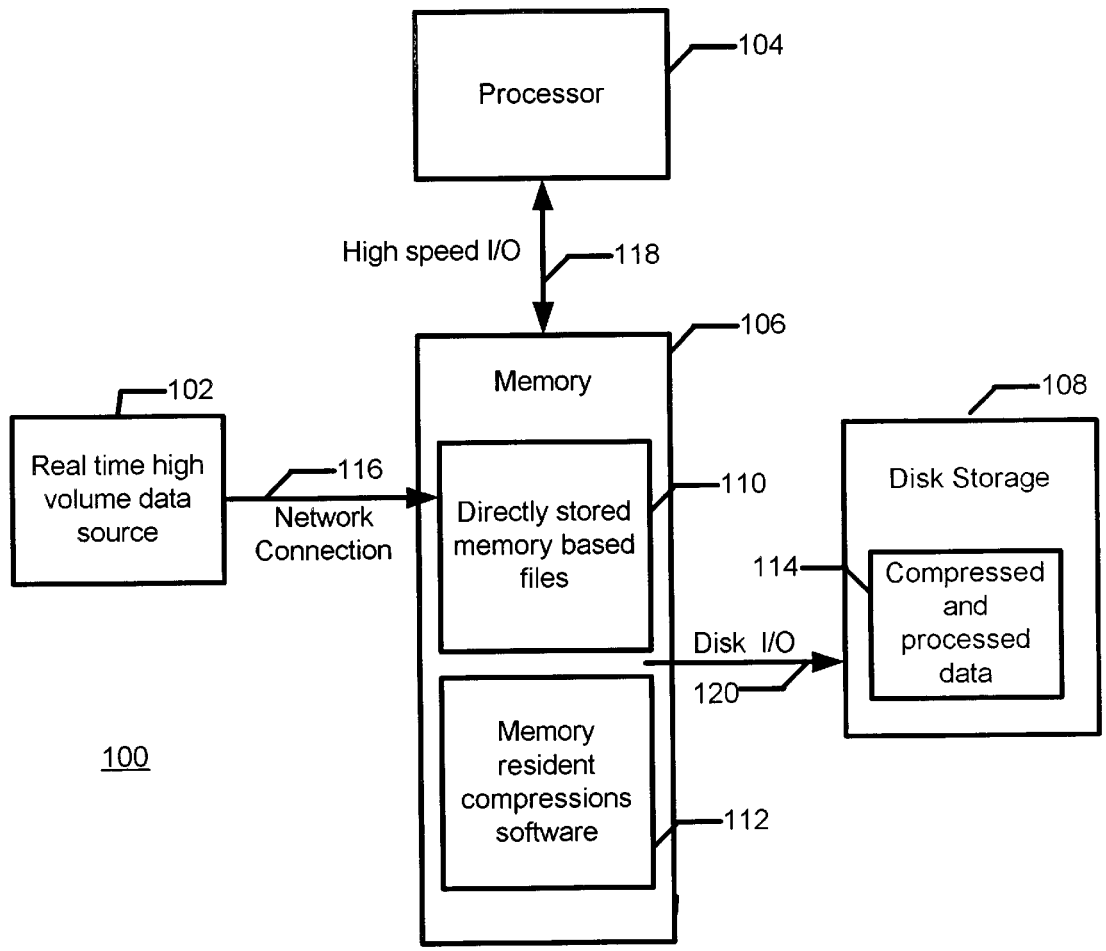
FIG. 1 is a block diagram of a system for high data rate computer processing.

Referring to FIG. 1, a system 100 is disclosed. The system 100 includes a processor 104, a memory 106, and disk storage 108. The memory 106 is coupled to the processor 104 via a high speed input-output connection 118. The memory 106 includes both directly stored memory based files 110 and memory resident compression software 112. The memory 106 is fed by a real-time high volume data source 102 via a network connection 116. The memory 106 is coupled to the disk storage unit 108 via a disk input output communication path 120. The disk storage 108 includes compressed and processed data 114.

During operation, high speed, high volume real-time data is received by memory 106 from the real-time source 102 over network connection 116. The memory 106 receives data and directly stores the received data into memory based files 110. The processor 104 retrieves the directly stored memory based files 110 via high speed I/O path 118. The processor 104 then performs processing on the received data to produce processed data. The processed data is then communicated back to memory 106 over I/O line 118 and is compressed by memory-resident compression software 112 to produce processed and compressed data. The processed and compressed data is then communicated from memory 106 to the disk storage unit 108 over the lower speed disk I/O path 120. The compressed and processed data 114 is then stored within the disk storage unit 108.

Figure 2:
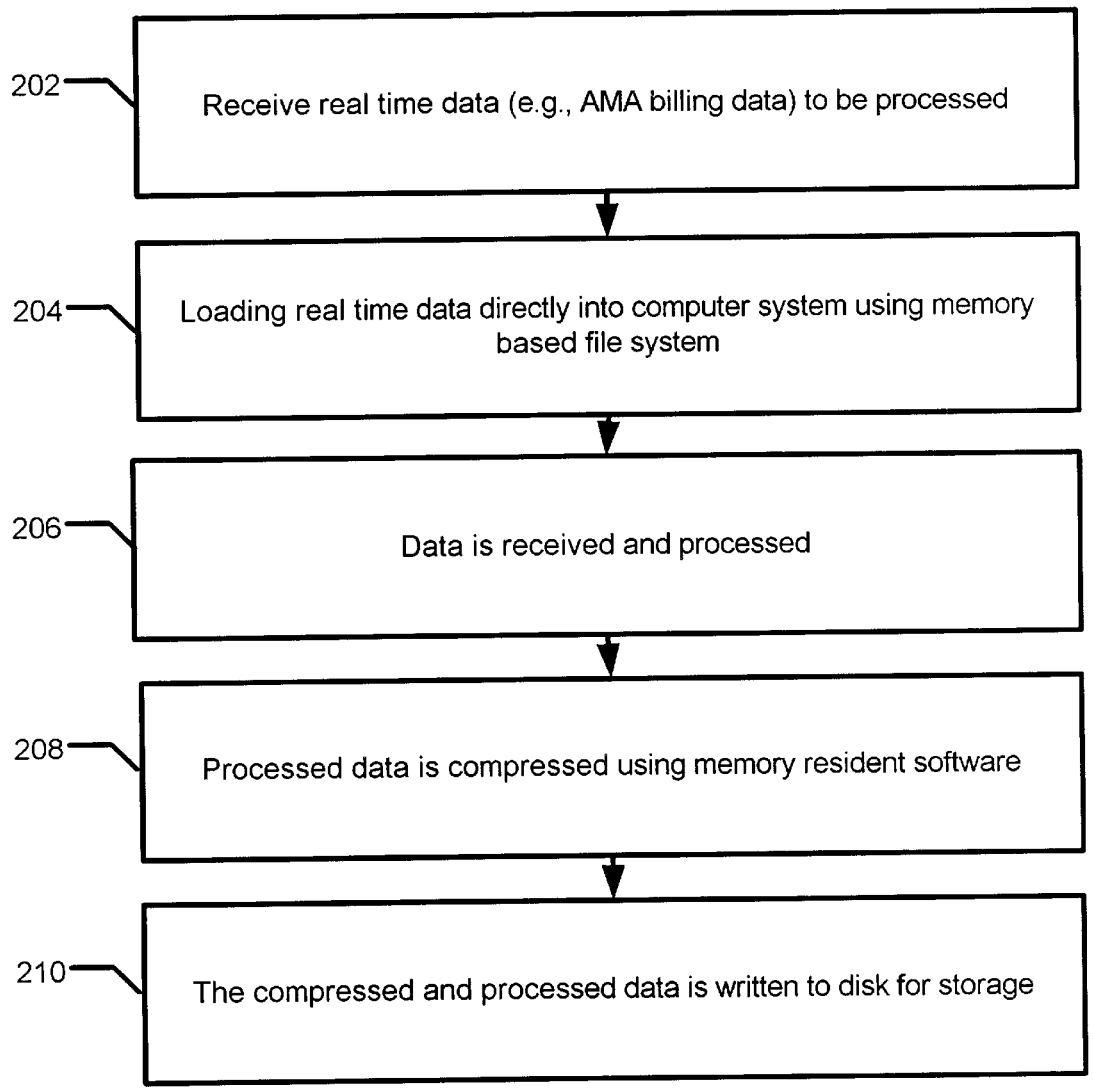
FIG. 2 is a flow chart that illustrates a method of processing data.

Referring to FIG. 2, a method of using the system 100 is illustrated. Real-time data, such as AMA billing data that is to be processed, is received at 202. The real-time data is then loaded directly into the computer system using a memory based file system, at 204. The memory based files may be retrieved and processed by a processor and processed data is then created, at 206. The processed data is compressed using memory resident compression software, at 208. After the processed data has been compressed, the resulting compressed and processed data is then written to an external disk for storage, at 210.

In a particular embodiment, the real-time data received is billing data from one or more telephony systems. In such an application, the data to be processed is received as a stream of continuous data. One aspect of the disclosed system is that the received data is stored directly into the dynamic computer memory 106, without performing any intermediate storage of the data to a slower speed device such as a magnetic disk storage device. Another aspect of the system 100 is that the compressed data produced by the memory resident compression software 112 consumes less memory storage capacity than the originally received data from the network connection 116. For this reason, the bandwidth requirements for the disk I/O path 120 and disk storage unit 108 is advantageously reduced. In a particular illustrative embodiment, the disk storage unit 108 may include a database for storing the compressed and processed data.

The disclosed system 100 allows a computer system processor 104 and memory 106 to process data at rates limited by the processor speed rather than disk I/O speeds. The system 100 thereby increases the data processing capability of a computer system to process data from real-time sources by reducing a significant portion of the slower disk I/O requirements. Efficiencies and additional savings may also be realized by using a single processor system to handle the data stream. The disclosed system 100 and accompanying method of operation is also useful in a situation where the computer and accompanying disk storage would not be capable of handling the high speed incoming real-time data stream due to lack of disk storage and disk I/O capability.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data processing system comprising:

a data processing device receiving input data to be processed, the input data to be processed communicated over a network communication channel;

a dynamic computer memory directly coupled to the data processing device via a high-speed memory bus, the dynamic computer memory including memory based files, the memory based files storing the input data to be processed, wherein the dynamic computer memory includes memory resident compression logic to compress output data that is produced by the data processing device after processing the input data; and a computer disk storage unit coupled to the data processing device via a disk input/output channel, and wherein the compressed version of the output data is communicated over the disk input/output channel to the computer disk storage unit wherein the data communication rate of the high-speed memory bus is substantially faster than the data communication rate of the disk input/output channel.

2. The system of claim 1, wherein the input data to be processed is real-time billing data retrieved from a telephony system.

3. The system of claim 2, wherein the data to be processed is a continuous stream of data.

4. The system of claim 1, wherein the input data to be processed is stored directly into the dynamic computer memory, without performing intermediate storage of the input data to a magnetic disk storage device.

5. The system of claim 1, wherein a compressed version of the output data consumes substantially less memory space than the output data produced by the data processing device.

6. The system of claim 1, wherein the computer disk storage unit includes a database.

* * * * *